Patented Sept. 27, 1932

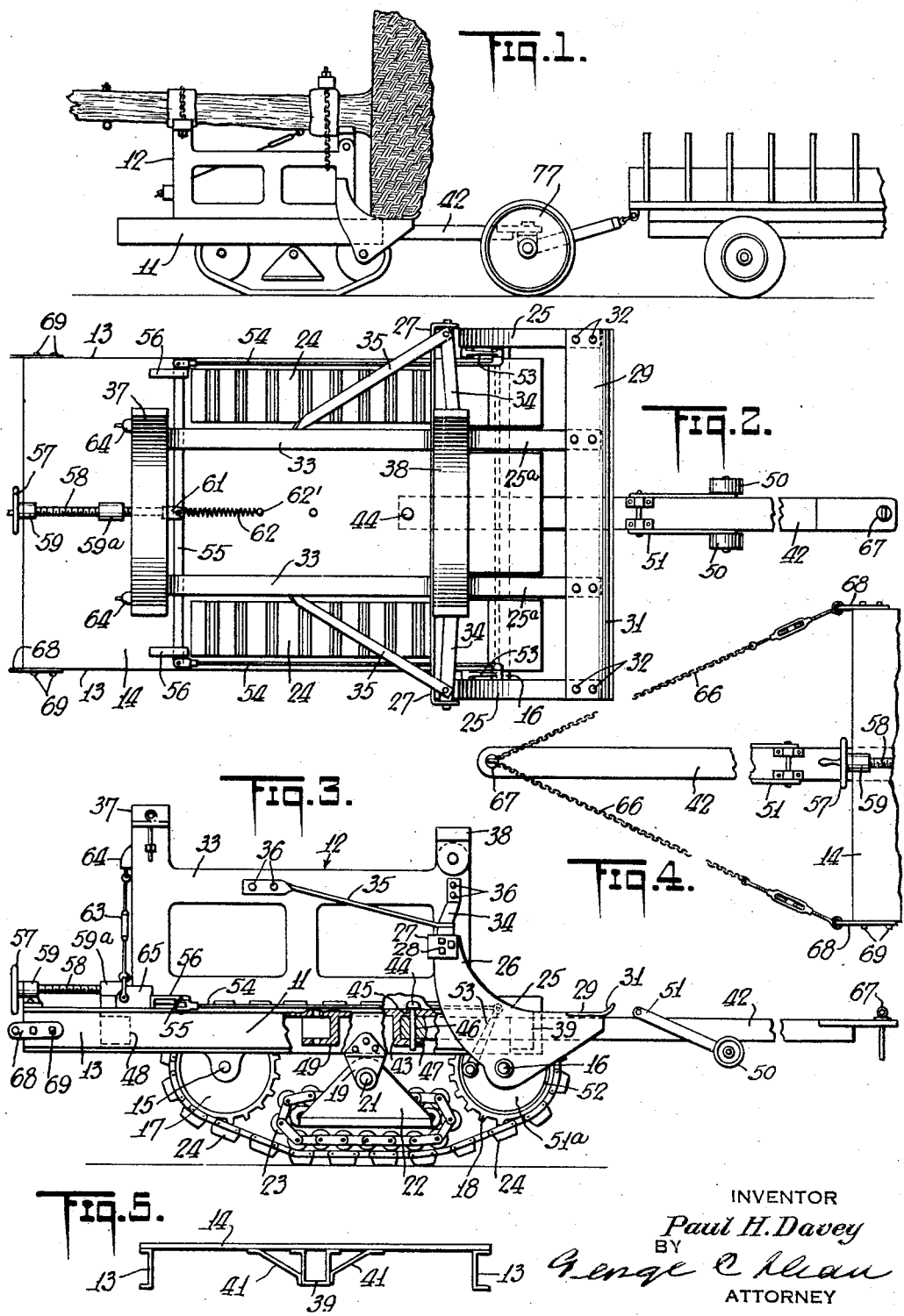

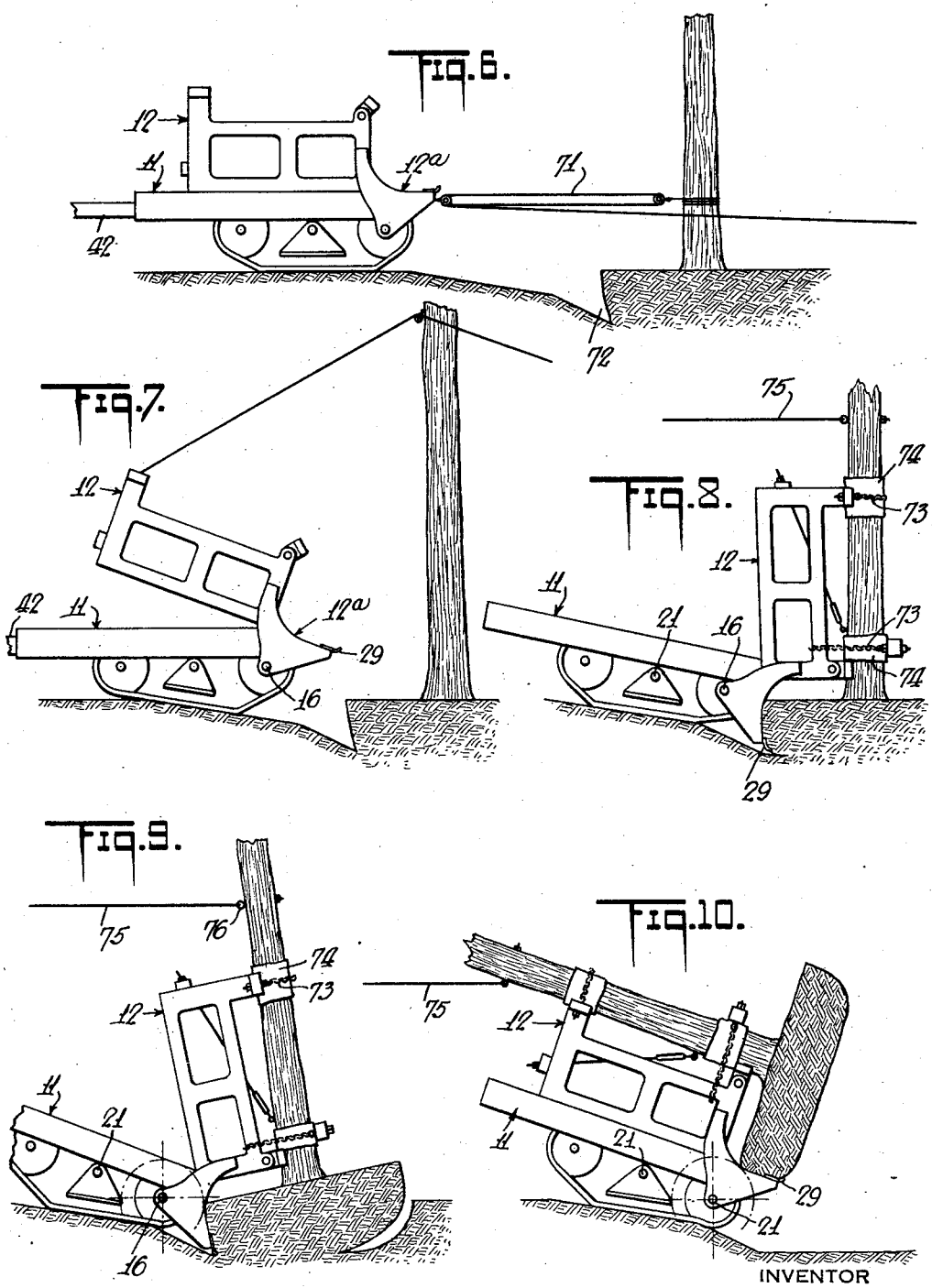

1,879,120

UNITED STATES PATENT OFFICE

PAUL H. DAVEY, OF KENT, OHIO

TREE REMOVING APPARATUS

Application filed August 20, 1930. Serial No. 476,530.

My present invention relates to apparatus for removing, transporting and replanting trees, particularly trees of large size which require that a relatively enormous ball or mass of earth be removed with the roots of the tree in their undisturbed position therein. As the roots are likely to be more or less close to the surface, the "ball" may be and usually is a disc of relatively large diameter so that safe handling of this composite load is a difficult matter.

Operations of this kind are commonly performed by affixing a cradle to the tree trunk and then tilting the tree to break loose the ball and pivot the cradle about a horizontal axis until the trunk rests on a wheel axle, substantially parallel with the ground.

In certain cases the tilting is accomplished by pulling the tree over without any definite or fixed fulcrum for the pivotal movement and without any attempt to lift the load as a whole. As contrasted with this, one object of my invention was to provide apparatus in which the tilting and falling of the tree is used as a part of the effort necessary to lift the entire load a substantial distance, thereby elevating the ball or disc out of the excavation at the same time it is tilted. Another object is to afford a fulcrum for the pivotal tilting movement a substantial distance above the bearing point of the fulcrum upon the ground. Another object of the invention is to afford a secondary pivotal fulcrum for the entire platform, after the tree carrying cradle has been tilted into bearing thereon.

To this end, I provide a structure somewhat like certain forms of caterpillar tractors except that the transportation structure is a trailer having ordinary front wheels from which it can be detached and to which it can be attached either by its front or rear. On this detachable rear section of the trailer is mounted a massive super-structure affording both a two-point cradle for the tree trunk and a large wide base or pan for support of the ball of earth and roots. The arrangement is such that when the super-structure is elevated for engagement with the tree to be moved, the weight of the super-structure causes the end of the caterpillar adjacent the tree and upon which the super-structure is pivoted, to tilt toward the surface of the ground, thereby permitting a definite downward, spade-like movement of the pan for its engagement with one edge of the ball or disc of earth, without the necessity for digging a long or deep runway to the trench which outlines the ball or disc of roots and earth. This is accomplished by having the main load carrying bearing of the trailer a pivot for a framework which transmits its load through anti-friction devices to the rear surface of the endless chain which carries the caterpillar tread engaging the ground. The idler sprocket wheels that guide the tread beneath this central bearing are of sufficiently small diameter or pivoted at a high enough level so that the lowermost portions of their peripheries are substantially above the level of the central tread portion of the chain; preferably the tree and ball support structure is pivoted on the axis of these idlers so that when said structure is tilted upward about said pivot, the idler supporting the weight thereof is forced into contact with the ground and through the tread chain affords a wide substantial bearing for the load and also affording the desired vertical downward movement for the ball engaging pan into the trench around the ball.

When the cradle has been secured to the tree with the parts in this position, the tilting of the tree and return of the weight lifts the ball and tree a substantial distance equal to approximately the radius of the idler sprocket wheel which affords the base of support for such movement, the gradually increasing leverage of the tree and cradle as they incline, affording a substantial part of the power for such shifting effort.

An important factor in this part of the operation is a powerful brake which locks the sprocket idler and with it the caterpillar tread against any possibility of movement during this tree removing operation.

After the apparatus has thus functioned with the idler as the fulcrum of operation, the cradle structure comes into contact with the trailer platform and thereafter the entire structure and its load is pivoted about the main bearing to horizontal position.

All of the above functions and operations are substantially reversed during the tree planting operation and with correlative advantages for quietly and controllably elevating the tree and lowering the ball into its excavation.

Another feature of the invention is providing detachable guiding or leader wheels having a draw bar adapted to be inserted into sockets provided at either end of the caterpillar unit to permit traction of the unit from one end while transporting the tree and from the other end for manipulation of the unit into operative position for either tree remover or replanting.

A further feature of the invention is an improved super-structure and particularly a wide lateral extension of the ball pan permitted by pivoting it to the idler axis outside of the idler wheels.

The above and other features of my invention may be more fully understood from the following description in connection with the accompanying drawings, in which Fig. 1 is a somewhat diagrammatic side elevation of a complete tree transporting organization showing a tree and its ball supported on a tree removing unit with its leader wheels attached being drawn by a motor truck;

Fig. 2 is a top plan view of the tree removing unit;

Fig. 3 is a side elevational view of the tree removing unit, partly in section, showing various details not shown in Fig. 1;

Fig. 4 is a detail view showing the manner in which the draw bar is attached to the rear of the tree removing unit;

Fig. 5 is a detail view of draw bar socket construction on the front and rear of the caterpillar crawler; and Figs. 6 to 10 inclusive, are somewhat diagrammatic views showing the manner in which the present apparatus operates for tree removing.

Like characters of reference indicate corresponding parts throughout the several views of the drawings.

In these drawings a preferred embodiment of the tree removing unit is shown as comprising a caterpillar trailer generally indicated by the reference numeral 11 upon which is mounted a tree supporting superstructure 12 which is adapted for pivotal movement relative thereto.

The caterpillar trailer may be of any usual construction and includes a frame 13 preferably of channel iron to which are secured the metal plates 14 to form a platform. Rigidly secured to the frame in any suitable manner are through extending shafts 15 and 16 on which are journaled the idler sprocket wheels 17 and 18, respectively. Also mounted on the frame, intermediate the shafts 15 and 16, is a bracket member 19 carrying a shaft 21 on which is journaled a rocker 22 having an extended bearing surface provided with antifriction rollers 23, in an endless chain arrangement. An endless tread chain 24 of any suitable design is trained about the sprocket wheels 17 and 18 and below the rollers 23. It will be understood that a similar tread chain organization is arranged on the other side of the unit.

The extremities of shaft 16 are extended to form journals for the arms, 25 one on each side. The upper ends 26 of these arms are joined by means of a transverse bracing member 27 fixed to the arms by bolts 28. An apron 29 having a concaved edge 31 is secured by means of rivets 32 to the lower ends of said arms.

As a tree supporting means there is provided a box-like structure comprising two spaced side frames 33 suitably secured to each other and having integral extension 25a, pivoted on shaft 16, similar to and parallel with arms 25, to which latter they are rigidly connected by means of transverse braces 34 and obliquely extending braces 35 which are fixed to the frames and levers by bolts 36, or the like. Attached to one end of the tree supporting structure is a fixed saddle, or cradle 37 and at the other end is a somewhat similar cradle 38, pivotally mounted for face engagement with the flaring base of the tree. The construction outlined above makes for a rigid superstructure of great strength adapted for movement relative to the caterpillar 11 about the shaft 16 as a fulcrum.

At the end of the frame there is suitably secured to the under side of the platform 14, a guide frame 39 formed of angle-iron and held in position by brackets 41. This guide is adapted to receive a draw bar 42, the rear end of which is seated in a socket 43 and retained therein by a bolt 44 passing through suitable openings 45, 46 and 47, in the platform 14, the draw bar 42 and the socket 43, respectively. A similar guide 48 and socket 49 are arranged at the rear end. Casters 50 attached by means of brackets 51 to the draw bar are for the purpose of facilitating the moving thereof when free of the trailer, the construction being such that it may be pushed or pulled in either direction.

In order to prevent longitudinal movement of the trailer during a tree removing or replanting operation, there is provided a braking means comprising any desired type of expanding brake mechanism (not shown) located behind stationary disc 51a adapted to engage the interior of brake flange 52 on sprocket wheel 18. The brake shoes are operated in the usual way, as by levers 53, which are connected by rods 54 to an equalizing cross-bar 55 guided in brackets 56. The braking means is operated by a screw nut wheel 57 rotating on a tension screw 58 which extends loosely through bracket 59. The screw is connected to the cross-bar 55 through a fork and pivot 61 and the screw and nut wheel are tensioned toward brake-releasing position by a spring 62 secured to the platform at 62'. The screw 58 may be additionally held against rotation by a spline in 59a.

The superstructure is held in position on the platform by means of adjustable tie-rods 63, attached bosses 64 on the super-structure, and bosses 65 fixed to the platform.

Fig. 4 shows a means whereby the draw-bar may be secured to the rear end of the trailer. It comprises a chain and adjustable tie-rod arrangement generally indicated by the reference character 66 attached to eye-bolt 67 at the free end of the draw bar and to apertured brackets 68 fastened by any suitable means, as by rivets 69, to the platform.

The relations of the essential parts and the way in which they operate to break out and remove a tree and its ball are diagrammatically illustrated in Figs. 6 to 10.

The bar 42 may be used in the position shown in Fig. 3 for drawing the trailer in approximate presentation for use. The draw bar may then be removed or, if desired, may be placed in the rear socket as indicated in Fig. 6 as a means for steering and controlling movements of the trailer into operative position. The final positioning may be by block and fall arrangement 71 as shown in Fig. 6, whereby the tree removing unit may be drawn to approximately the position shown in Fig. 7. In this position the unit is in operative relation to the trench which has been dug out about the tree to form the ball and the tree supporting cradle 12ª is now tilted about the horizontal, pivotal axis to bring it into approximately vertical position. The brakes may then be released and the shovel or pan member 29 moved into solid contact with the side of the ball of earth, as indicated in Fig. 8. The cradle is then fastened to the tree trunk by means of chains 73, padding 74 being placed under the chains to prevent bruising of the bark. A cable 75 is then attached to the tree trunk at a suitable high level and the trunk is used as a lever to tilt the tree and break loose the ball, as shown in Fig. 9. As soon as a substantial tilt has occurred, the forward sprocket wheel and portion of the tread chain thereon are pushed down into firm bearing upon the earth. The brakes now being tightly locked, rearward slip of the caterpillar structure is prevented by reason of the great surface of engagement of the tread chain with the earth and thereafter further tilting of the tree is by pivoting about the axis of the said wheel. As will be evident from the dotted line quadrant showing vertical, horizontal and the arc of movement, such pivotal movement involves lifting of the ball from the position shown in Fig. 9 to that shown in Fig. 10, where the cradle is once more seated on the platform 11 and may be secured by the tension members 63 shown in Fig. 3.

The above lifting of the load during the tilting thereof is important since it occurs at a time when the tension of cable 75 is most nearly at right angles to the trunk and hence most effective. The entire operation to the position shown in Fig. 10 is normally controlled by tension on cable 75. Of course, gravity is becoming continuously more effective on the trunk and branches, as the tree becomes more inclined, but in the case of a very tall tree with many branches, or an exceptionally light ball of earth for the roots, the action of gravity may become sufficiently effective to release all tension on cable 75 by or before the time the tree is in the position shown in Fig. 10.

After reaching the position shown in Fig. 10, the further movement of the tree to horizontal and the ball to vertical is about the central pivotal axis 21.

The tree removing unit thus loaded is pulled away from the trench, the draw bar attached to the front end of the structure and to the wheel 77, after which the unit and the tree may be transported to the location where the tree is to be replanted.

As before stated, the operations in reverse order to the foregoing are performed in replanting, the load first pivoting about axis 21 and then about the axis of the forward sprocket wheel, the ball being lowered into the hole prepared for it and the tree brought to upright position under control of tension of cable 75.

While the above type of "caterpillar crawler" is particularly desirable because of the two centers of pivoting which it affords for the load and the smallness of the idler wheel which affords the fulcrum bearing for lifting the load, it will be evident that any caterpillar trailer having sufficiently small wheels may be employed. For smaller trees, the diameter of these wheels and the distance of lift of the load during pivoting may be much greater than that indicated for the preferred form, and in certain cases also it may be possible to arrange for the pivotal tilt about an axis lower than the axis of the tread wheel.

While particularly designed and intended for trees, certain novel features of the invention would be applicable to transportation, placing or removal of other upright objects.

I claim:—

1. Apparatus for removing trees with an attached ball of earth and embedded roots, said apparatus including a caterpillar vehicle having a tread chain and sprocket wheels therefor, and a super-structure pivoted for vertical tilt on said vehicle and having tree-trunk and ball engaging cradles and trunk securing means of a height sufficient to engage the trunk of the tree when the super-structure is tilted upright while the wheels are outside the periphery of said ball, said super-structure being pivoted on the same axis as the adjacent sprocket wheels, so that the wheels and tread chain form a stable base of support for lifting the ball when the tree trunk is tilted toward the vehicle.

2. Apparatus for removing trees with an attached ball of earth and embedded roots, said apparatus including a caterpillar vehicle having a tread chain and sprocket wheels therefor, and a super-structure pivoted for vertical tilt on said vehicle and having tree-trunk and ball engaging cradles and trunk securing means of a height sufficient to engage the trunk of the tree when the super-structure is tilted upright while the wheels are outside the periphery of said ball, said super-structure being pivoted on the same axis as the adjacent sprocket wheels, so that the wheels and tread chain form a stable base of support for lifting the ball when the tree trunk is tilted toward the vehicle, in combination with means for preventing rearward rolling of the vehicle when the tilting stresses are applied.

3. Apparatus for removing trees with an attached ball of earth and embedded roots, said apparatus including a caterpillar vehicle having a tread chain and sprocket wheels therefor, and a super-structure pivoted for vertical tilt on said vehicle and having tree-trunk and ball engaging cradles and trunk securing means of a height sufficient to engage the trunk of the tree when the super-structure is tilted upright while the wheels are outside the periphery of said ball, said super-structure being pivoted on the same axis as the adjacent sprocket wheels, so that the wheels and the tread chain form a stable base of support for lifting the ball when the tree trunk is tilted toward the vehicle, in combination with brakes for preventing rearward rolling of the vehicle when the tilting stresses are applied.

4. In an apparatus of the character described, the combination with a caterpillar vehicle, of a super-structure, adapted for supporting a tree, pivotally connected to said vehicle at one end thereof for endwise tilting movement relative thereto and means on said vehicle serving as a fulcrum for said vehicle when the latter is tilted endwise and said super-structure is pivoted therefrom toward a vertical position.

5. In an apparatus of the character described, the combination with a caterpillar crawler vehicle having tread chains, end idler wheels and an intermediate transverse pivot carrying a support for the chain, of a super-structure, adapted for supporting a tree, pivotally connected to said crawler for movement relative thereto, said idler wheels serving as fulcruming means for the super-structure when the vehicle is tilted endwise said pivoted support for the chain affording a fulcrum when the pivotal support for the tree engages the tilted vehicle.

6. In an apparatus of the character described, the combination with a caterpillar crawler, including a plurality of pairs of idler wheels, of a super-structure, adapted to support a tree, pivotally connected to said crawler for movement relative thereto, one of said pairs of idler wheels serving as fulcruming means for the super-structure when the vehicle is tilted endwise.

7. In an apparatus of the character described, the combination with a caterpillar vehicle, including shafts fixed thereto and idler wheels journaled on said shafts, of a super-structure, adapted for supporting a tree, pivotally mounted on one of said shafts for movement relative to said vehicle.

8. In an apparatus of the character described, the combination of a caterpillar vehicle, including a shaft having idler wheels journaled thereon, of a super-structure, adapted for supporting a tree, pivotally mounted on said shaft for movement relative to said crawler, said idler wheels serving as a lifting fulcrum when the super-structure is loaded and is being tilted toward or from normal rest position on the vehicle.

Signed at Kent, in the county of Portage, and State of Ohio this 15th day of August, A. D. 1930.

PAUL H. DAVEY.